M. WILSON.
Cultivator.
No. 68,678.
Patented Sept. 10, 1867.
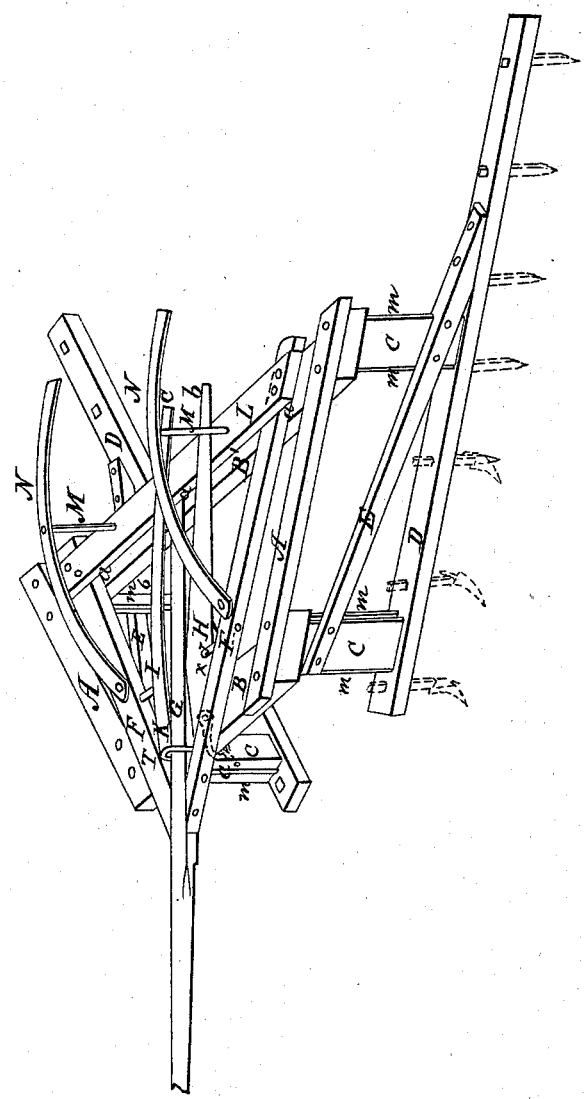
Witnesses:
L. R. Davis
S. N. Palmer
Inventor:
Marmaduke Wilson

UNITED STATES PATENT OFFICE.

MARMADUKE WILSON, OF MARQUETTE, WISCONSIN.

CORN-CULTIVATOR.

Specification forming part of Letters Patent No. 68,678, dated September 10, 1867.

*To all whom it may concern:*

Be it known that I, MARMADUKE WILSON, of Marquette, Green Lake county, and State of Wisconsin, have invented a new and useful Improvement in Corn-Cultivators; and I do hereby declare that the following is a full and exact description of the construction and operation of the same, reference being had to the annexed perspective drawing, and to the letters of reference marked thereon.

The nature of my invention consists in the construction of a corn-cultivator provided with hand-levers arranged for the purpose of elevating and depressing the front part of the cultivator to regulate penetration of the teeth into the soil; also, by placing the main frame-work upon vertical standards to elevate it above the diverging beams for holding the teeth sufficiently high to enable the young standing corn to pass between the forward ends of the beams without injury; and, further, to provide an effective device for attaching the tongue to the frame, so that levers of the simplest form may be applied in the most effective manner for the purpose stated, and in other improvements of the machine, which will be apparent upon inspection.

To enable others skilled in the art to make and use my invention, I will proceed to describe its construction and operation.

The main frame-work of the machine is composed of the plates A A, connected firmly together by the cross-pieces B B'. To this framework are attached the teeth-beams D D by means of the standards C C C C. This connection is formed by the bolts or staples *m m*, &c., passing down the edges of the standards and partially embedded in them, terminating on the under side of the beams with screws and nuts, and the whole strengthened and rendered firm by the diagonal braces E E, attached and bolted to the standards and beams, as clearly indicated in the drawing.

G is the tongue; and F F the hounds, which are attached to the cross-piece B' at the points *a a a* in such manner as to admit of the elevation or depression of the tongue to an extent limited by the staple T, attached to the cross-piece B, by the action of the levers H I, for the purpose of controlling the penetration of the teeth in the soil, as follows: The lever H is attached to the tongue by a rod, J, passing loosely through it and attached to the tongue and hounds, as shown. The front end of this lever bears upon the cross-piece B, so that, being raised at *b*, it depresses the cross-piece, and consequently the front part of the cultivator, thus causing the teeth to take a deeper penetration in the soil. The lever I being, on the contrary, attached to the cross-piece B by a staple, K, and resting upon the upper side of the rod J, by being depressed at *c* raises the front part of the cultivator, which has a tendency to withdraw the teeth from the soil.

L is a bar, in which are inserted the standards M M, supporting the handles N N.

It is obvious that the lever I might be dispensed with by attaching the lever H to the cross-piece B by a staple, K, allowing a small amount of end-play; but in actual use both levers may at times be found convenient.

This machine is intended particularly for cultivating corn, but may be used for any purpose to which an ordinary cultivator or drag may be put, and may be provided with any kind of cultivator-teeth or drag-teeth, or with both combined.

The front ends of the beams should be about ten inches apart when the corn is young, and the rear ends may be six or eight feet apart, in order to cultivate two rows of corn at the same time, or four feet for one row only. When used for one row it should have three cultivator-teeth on each side, with three or more drag-teeth on each side, also behind the cultivator-teeth.

It will be observed that the clevis O is attached to the cross-piece B, instead of being attached to the tongue in the usual way. By this arrangement the relative position of the tongue and the frame to each other is more easily changed by means of the levers H and I, they co-operating with the tongue to regulate the penetration of the teeth in an easy and effective manner by entirely relieving the levers from the violent resisting-force of the teeth, which would necessarily be brought upon them by attaching the draft-power to the tongue, as is now the custom.

It is obvious this machine may be, for convenience, mounted upon wheels in any usual manner without departing from the nature of the invention.

Having thus described the construction and operation of my invention, what I claim, and desire to secure by Letters Patent, is—

1. The levers H and I used in combination with the tongue G and cross-bars B B' of a cultivator-frame, arranged and operating substantially as and for the purpose set forth.

2. The combination of the standards C C C C with the frame A A B B' and braces E E, as and for the purpose set forth.

3. The clevis O, attached to the cross-bar B, in combination with the adjustable tongue G and levers H I, substantially as and for the purpose set forth.

MARMADUKE WILSON.

Witnesses:
L. R. DAVIS,
S. H. PALMER.